(12) United States Patent
Nishiguchi et al.

(10) Patent No.: US 11,046,021 B2
(45) Date of Patent: Jun. 29, 2021

(54) METHOD FOR JOINING METAL MEMBER AND THERMOSETTING RESIN MEMBER, AND METAL MEMBER, THERMOSETTING RESIN MEMBER, AND THERMOPLASTIC RESIN SHEET FOR USE THEREIN

(71) Applicant: MAZDA MOTOR CORPORATION, Hiroshima (JP)

(72) Inventors: Katsuya Nishiguchi, Hiroshima (JP); Koujirou Tanaka, Hiroshima (JP); Satoko Shimada, Hiroshima (JP); Yasuhiro Morita, Aki-gun (JP); Tsuguhisa Miyamoto, Aki-gun (JP); Yushi Matsuda, Higashi Hiroshima (JP); Yukihiro Sugimoto, Higashi Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 436 days.

(21) Appl. No.: 15/762,767

(22) PCT Filed: Mar. 27, 2017

(86) PCT No.: PCT/JP2017/012470
§ 371 (c)(1),
(2) Date: Mar. 23, 2018

(87) PCT Pub. No.: WO2017/170445
PCT Pub. Date: Oct. 5, 2017

(65) Prior Publication Data
US 2019/0077089 A1 Mar. 14, 2019

(30) Foreign Application Priority Data
Mar. 29, 2016 (JP) .............................. JP2016-066355

(51) Int. Cl.
*B23K 20/00* (2006.01)
*B29C 65/00* (2006.01)
(Continued)

(52) U.S. Cl.
CPC ...... *B29C 66/83221* (2013.01); *B23K 20/122* (2013.01); *B29C 65/0681* (2013.01);
(Continued)

(58) Field of Classification Search
CPC ........ B23K 20/00; B23K 20/10; B23K 20/12; B23K 20/122; B29C 65/00; B29C 65/06;
(Continued)

(56) References Cited

U.S. PATENT DOCUMENTS

2014/0064830 A1 3/2014 Nagano et al.

FOREIGN PATENT DOCUMENTS

| CN | 102239027 A | 11/2011 |
|---|---|---|
| CN | 103391828 A | 11/2013 |

(Continued)

OTHER PUBLICATIONS

International Search Report issued in PCT/JP2017/012470; dated Apr. 25, 2017.

*Primary Examiner* — Jacob T Minskey
*Assistant Examiner* — Matthew Hoover
(74) *Attorney, Agent, or Firm* — Studebaker & Brackett PC

(57) ABSTRACT

Disclosed is a method for joining a metal member and a thermosetting resin member together with a thermoplastic resin interposed therebetween.

17 Claims, 5 Drawing Sheets

(51) Int. Cl.
    *B29C 65/44*      (2006.01)
    *B29C 65/06*      (2006.01)
    *B29C 65/82*      (2006.01)
    *B29C 65/48*      (2006.01)
    *B23K 20/12*      (2006.01)

(52) U.S. Cl.
    CPC .......... B29C 65/44 (2013.01); B29C 65/4815 (2013.01); B29C 65/8215 (2013.01); B29C 66/1122 (2013.01); B29C 66/21 (2013.01); B29C 66/43 (2013.01); B29C 66/7394 (2013.01); B29C 66/742 (2013.01); B29C 66/8322 (2013.01)

(58) Field of Classification Search
    CPC ... B29C 65/068; B29C 65/0681; B29C 65/40; B29C 65/44; B29C 65/48; B29C 65/481; B29C 65/4815; B29C 65/80; B29C 65/82; B29C 65/821; B29C 65/8215; B29C 66/00; B29C 66/10; B29C 66/11; B29C 66/112; B29C 66/1122; B29C 66/20; B29C 66/21; B29C 66/40; B29C 66/43; B29C 66/70; B29C 66/73; B29C 66/739; B29C 66/7394; B29C 66/74; B29C 66/742; B29C 66/80; B29C 66/83; B29C 66/832; B29C 66/8322; B29C 66/83221
    See application file for complete search history.

(56) References Cited

FOREIGN PATENT DOCUMENTS

| | | |
|---|---|---|
| JP | 2002-059485 A | 2/2002 |
| JP | 2006-297929 A | 11/2006 |
| JP | 3142091 U | 6/2008 |
| JP | 2009-279858 A | 12/2009 |
| JP | 2012-232531 A | 11/2012 |
| JP | 2014-208461 A | 11/2014 |

METHOD FOR JOINING METAL MEMBER AND THERMOSETTING RESIN MEMBER, AND METAL MEMBER, THERMOSETTING RESIN MEMBER, AND THERMOPLASTIC RESIN SHEET FOR USE THEREIN

TECHNICAL FIELD

The present invention relates to a method for joining a metal member and a thermosetting resin member, and a metal member, a thermosetting resin member, and a thermoplastic resin sheet used in the method.

BACKGROUND ART

Weight reduction has been required in various fields, for example, of automobiles, railcars, and airplanes. For example, in the automotive field, use of high-tensile materials has promoted reduction in the thickness of steel sheets. In addition, an aluminum alloy material, or even a resin material, has been used as an alternative to a steel material. In such fields, development of technologies for joining a metal member and a resin member plays an important role not only in reducing the weight of a vehicle body, but also in improving strength and rigidity of a joined product, and productivity.

So far, so-called "friction stir welding" (FSW) has been proposed as a method for joining a metal member and a resin member together. In the friction stir welding, as shown in FIG. 7, a metal member 511 and a resin member 512 are stacked one above the other, and a rotary tool 516, which is rotating, is pressed against the metal member 511 to generate frictional heat, by which the resin member 512 is molten. Thereafter, the molten resin member 512 is solidified to join the metal member 511 and the resin member 512 together (see, e.g., Patent Document 1). However, if a thermosetting resin member is used as the resin member, the resin member cannot be joined to the metal member because the thermosetting resin is not molten by heat.

CITATION LIST

Patent Documents

Patent Document 1: Japanese Unexamined Patent Publication No. 2014-208461

SUMMARY OF THE INVENTION

Technical Problem

In view of the foregoing background, one or more aspects of the present invention are directed to provide a method for joining a metal member and a resin member together, even if a thermosetting resin member is used as the resin member.

Solution to the Problem

The present invention relates to a method for joining a metal member and a thermosetting resin member together with a thermoplastic resin interposed therebetween.

Advantages of the Invention

The joining method of the present invention allows a metal member and a thermosetting resin member to be joined together.

DETAILED DESCRIPTION

Figure 1:
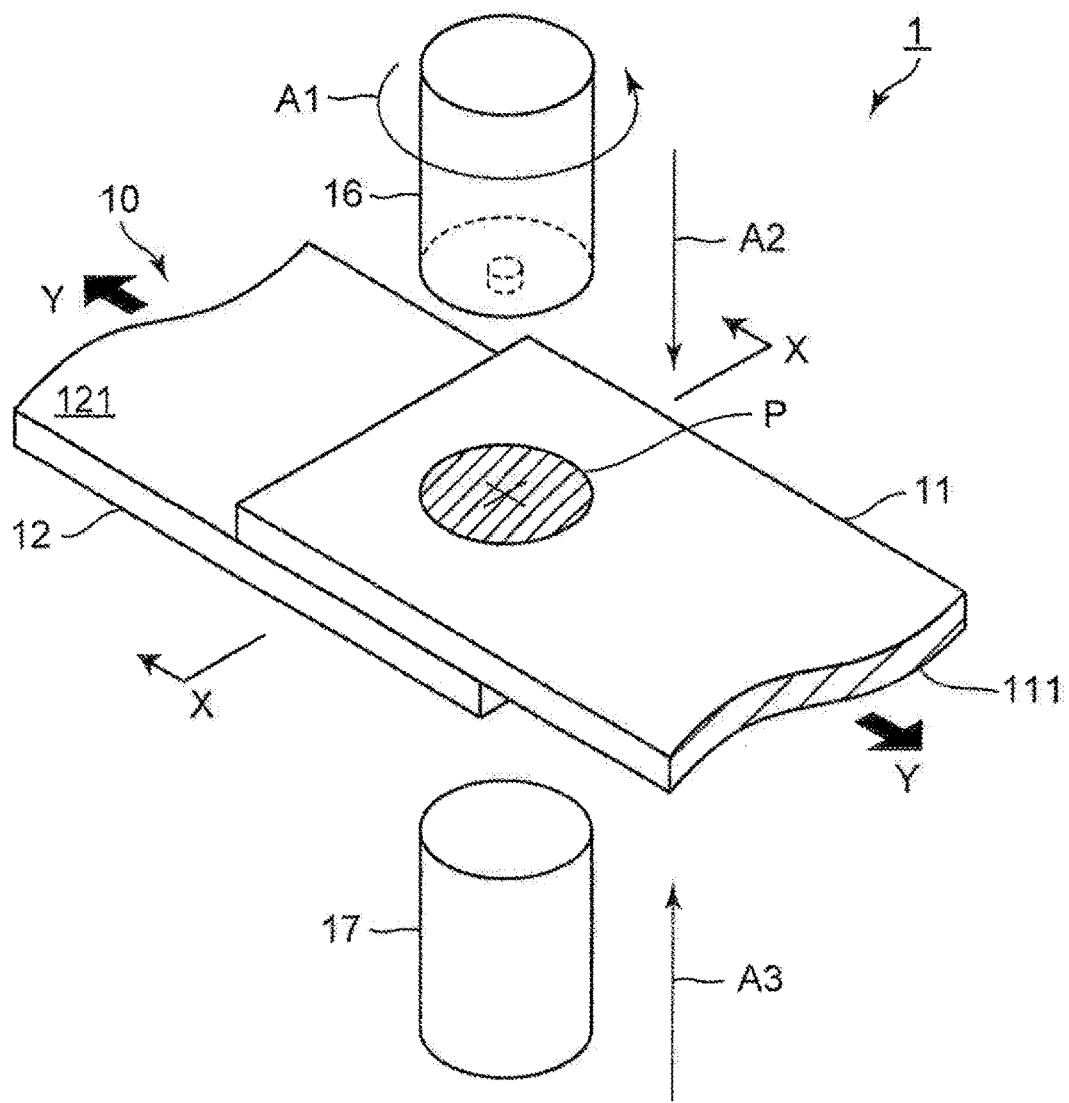
FIG. 1 is a schematic view illustrating an example of a part of a friction stir welding apparatus suitable for a method for joining a metal member and a thermosetting resin member of the present invention.

Method for Joining Metal Member and Thermosetting Resin Member

According to a method for joining a metal member and a thermosetting resin member of the present invention, the metal member and the thermosetting resin member are joined together through melting and solidification of a thermoplastic resin interposed between the metal member and the thermosetting resin member. The method for joining the metal member and the thermoplastic resin member of the present invention is not particularly limited as long as the metal member and the thermosetting resin member are joined together through melting and solidification of the thermosetting resin between the metal member and the thermoplastic resin member.

For example, thermocompression welding may be used as the joining method of the present invention. The thermocompression welding is a process of pressurizing an object with a pressing member, while applying heat to the object from the pressing member or a different means. Non-limiting examples of the thermocompression welding include friction stir welding, ultrasonic welding, laser welding, resistance welding, and induction welding. Among them, a method of locally applying heat and pressure to the metal member using a pressing member is preferable, and the friction stir welding is more preferable.

In the friction stir welding, as will be described in detail later, a metal member and a resin member are stacked one above the other, and a rotary tool as a pressing member, which is rotating, is pressed against the metal member to generate frictional heat, by which the resin member is softened and molten. Thereafter, the molten resin member is solidified to join the metal member and the resin member together.

In the ultrasonic welding, as will be described in detail later, a metal member and a resin member are stacked one above the other, and allowed to vibrate ultrasonically with pressure being applied to the metal member by a pressing member, thereby softening and melting the resin member by frictional heat generated between the resin member and the metal member through the vibration. Thereafter, the molten resin member is solidified to join the metal member and the resin member together.

In the laser welding, a pressing member presses and fixes a stack of a metal member and a resin member, and laser is applied to the metal member to generate heat, by which the resin member is softened and molten. Thereafter, the molten resin member is solidified to join the metal member and the resin member together. Non-limiting examples of the laser include YAG laser, fiber laser, and semiconductor laser.

In the resistance welding, a pressing member presses and fixes a stack of a metal member and a resin member, and a current is directly allowed to flow through the metal member to generate heat, by which the resin member is softened and molten. Thereafter, the molten resin member is solidified to join the metal member and the resin member together.

In the induction welding, a pressing member presses and fixes a stack of a metal member and a resin member, and an induced current is allowed to flow through the metal member by electromagnetic induction to generate heat, by which the resin member is softened and molten. Thereafter, the molten resin member is solidified to join the metal member and the resin member together.

Referring to the drawings, it will be described below the method for joining the metal member and the resin member of the present invention using friction stir welding. It is obvious that other joining methods than those described above can also provide the advantages of the present invention as long as a metal member and a resin member are joined together through melting and solidification of a thermoplastic resin between the metal member and the resin member. Note that components shown in the drawings are merely illustrated in a schematic manner for the purpose of making the present invention comprehensible, and their appearance and dimensional ratio may differ from actual ones. In this specification, "vertical," "horizontal," "front," and "rear" directions used directly or indirectly in the specification respectively correspond to the "vertical," "horizontal," "front" and "rear" directions in the drawings. Unless otherwise specified, common reference characters designate identical members, parts, dimensions or regions in drawings.

[Method for Joining Metal Member and Resin Member by Friction Stir Welding]

A joining method of the present invention (friction stir welding) will be described in detail below.

(1) Joining Apparatus

FIG. 1 is a schematic view illustrating an example of a part of a friction stir welding apparatus suitable for the joining method of the present invention. A friction stir welding apparatus 1 shown in FIG. 1 is configured as an apparatus for joining a metal member 11 and a resin member 12 by friction stir welding, and includes a cylindrical rotary tool 16 as a pressing member.

The rotary tool 16, which is driven by a driving source (not shown) to rotate about a center axis line X (shown in FIG. 2) in a direction of the arrow A1, moves down in a direction of the arrow A2 toward a work 10 obtained by vertically stacking the metal member 11 on the resin member 12 with a thermoplastic resin (not shown) interposed between. At this time, the rotary tool 16 applies pressure to a pressure region P (to-be-pressed region) of a surface of the metal member 11. The pressure applied by the rotary tool 16 generates frictional heat, which is transmitted to the thermoplastic resin to soften and melt the thermoplastic resin. Thereafter, the molten resin is solidified. As a result, the metal member 11 and the resin member 12 are joined together.

Figure 2:
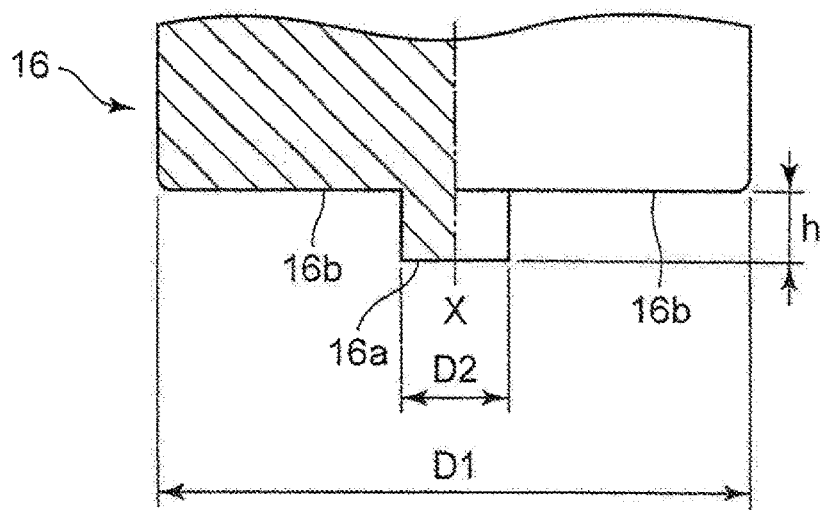
FIG. 2 is a view illustrating, in an enlarged scale, a tip end of an example of a rotary tool as a pressing member used in the joining method of the present invention.

FIG. 2 illustrates a tip end of the rotary tool 16 in an enlarged scale. In FIG. 2, a right half illustrates the appearance of the rotary tool 16, and a left half illustrates a cross section of the rotary tool 16. As shown in FIG. 2, the cylindrical rotary tool 16 includes, at its tip end (a lower end in FIG. 2), a pin 16a and a shoulder 16b. The shoulder 16b is a tip end portion of the rotary tool 16 including a round end face of the rotary tool 16. The pin 16a is a cylindrical portion protruding outward (downward in FIG. 2) from the round end face of the rotary tool 16 along the center axis line X of the rotary tool 16, and has a smaller diameter than the shoulder 16b. The pin 16a positions the rotary tool 16 when the rotary tool 16, which is rotating, first comes into contact with, and presses, the work 10.

The material of the rotary tool 16 and the dimensions of the pin and shoulder of the rotary tool 16 may be determined based on the kind of metal forming the metal member 11 to be pressed by the rotary tool 16. For example, if the metal member 11 is made of an aluminum alloy, the rotary tool 16 may be made of tool steel (e.g., SKD61), the shoulder 16b may have a diameter D1 of 10 mm, and the pin 16a may have a diameter D2 of 2 mm and a protruding height h of 0.5 mm. Alternatively, if the metal member 11 is made of steel, the rotary tool 16 may be made of silicon nitride, polycrystalline cubic boron nitride (PCBN), or any other suitable material, the shoulder 16b may have a diameter D1 of 10 mm, and the pin 16a may have a diameter D2 of 3 mm and a protruding height h of 0.5 mm. Needless to say, the materials and dimensions are merely examples, and are not limiting. For example, the diameter D1 of the shoulder 16b is generally 5-30 mm, preferably 5-15 mm, but is not limited thereto.

A cylindrical receiving tool 17 having a diameter equal to or larger than the diameter of the rotary tool 16 is arranged coaxially with, and below, the rotary tool 16. The receiving tool 17 is moved up by the driving source (not shown) toward the work 10 in a direction of the arrow A3. The receiving tool 17 brings its upper end face into contact with a lower surface of the work 10 (specifically, a lower surface of the resin member 12) by the time when the rotary tool 16 starts pressing the work 10 at the latest. With the work 10 sandwiched between the receiving tool 17 and the rotary tool 16, the receiving tool 17 supports the work 10 from below against the pressure applied by the rotary tool 16 during a pressing period, i.e., during the friction stir welding. Note that the receiving tool 17 is not necessarily moved in the direction of the arrow A3. Alternatively, the rotary tool 16 may be moved in the direction of the arrow A2 after the work 10 is placed on the receiving tool 17.

The friction stir welding apparatus 1 is mounted on a drive controller (not shown) comprised of an articulated robot or any other suitable device. The drive controller suitably controls the coordinate positions of the rotary tool 16 and receiving tool 17, the rotation speed (rpm) of the rotary tool 16, the pressure applied (N), the pressing time (sec), and any other suitable parameter. Although not shown in FIG. 1, the friction stir welding apparatus 1 includes a jig, such as a spacer or a clamp, for fixing the work 10 in advance, and restricting the metal member 11 from warping upward when pressed by the rotary tool 16.

(2) Thermoplastic Resin

A thermoplastic resin 50 (see FIG. 3) is a so-called "intermediate adhesive layer" which contributes to the joining of the metal member 11 and the resin member 12. The thermoplastic resin 50 is molten by heat applied thereto, and then cooled to be solidified, thereby allowing the metal member 11 and the resin member 12 to be joined together.

Figure 3:
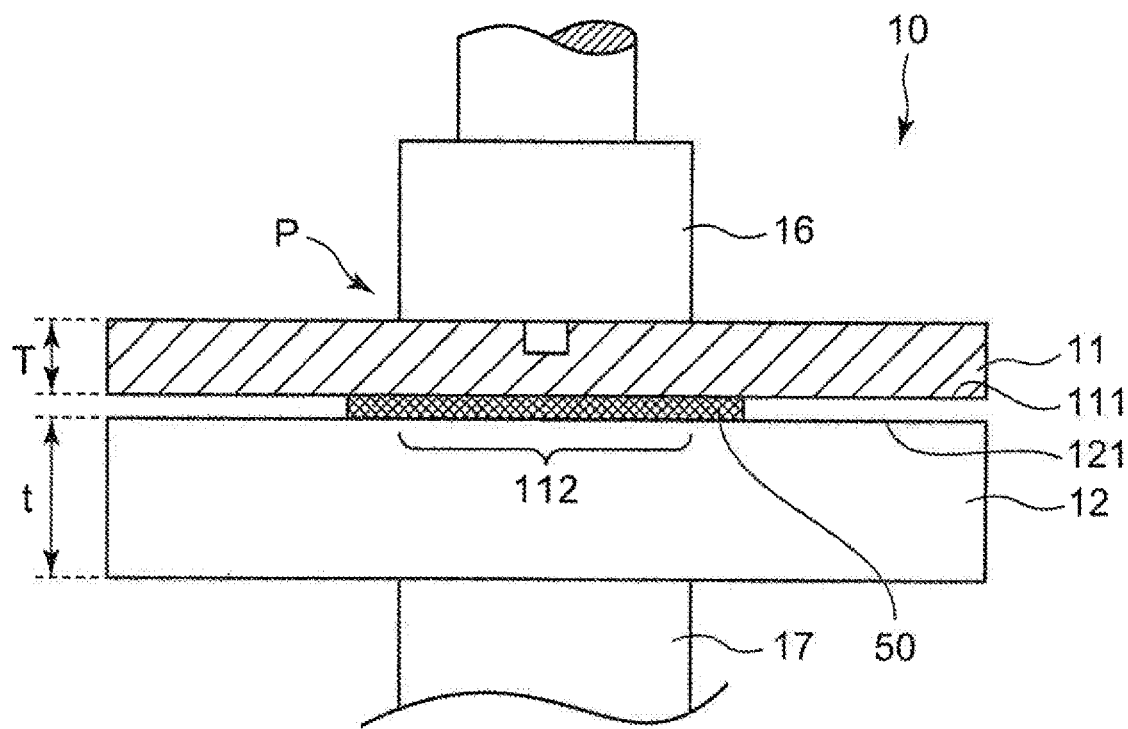
FIG. 3 is a schematic cross-sectional view illustrating an example of a preheating process of the present invention.

The thermoplastic resin 50 may have any form as long as it is interposed between the metal member 11 and the resin member 12. For example, the thermoplastic resin may be in the form of a sheet, a coating formed on the surface of the metal member, or a coating formed on the surface of the resin member, or may have a combination of these forms. The "sheet" is a thin plate-shaped product which is not adhered to the metal member nor the resin member, and can be traded independently. The sheet can be formed by thermally pressing a thermoplastic resin. The "coating formed on the surface of the metal member" or the "coating formed on the surface of the resin member" is a thin film adhered to the surface of the metal member or resin member, and can be formed by applying a solution or dispersion of a thermoplastic resin on the surface, and drying the applied solution or dispersion. The thermoplastic resin has "a combination of these forms" means that the thermoplastic resins in the form of at least two of the forms described above are interposed between the metal member 11 and the resin member 12. FIG. 3 is a schematic cross-sectional view taken along line X-X and viewed in a direction of the arrows shown in FIG. 1, illustrating an example of a preheating process of the present invention described later.

The kind of the thermoplastic resin is not particularly limited, and every kind of thermoplastic polymers may be used. Above all, thermoplastic polymers used in the automotive field, in particular, those having a functional group are preferably used. If the thermoplastic resin interposed between the metal member and the resin member has a functional group, the interaction between the thermoplastic resin and the resin member 12 and the interaction between the thermoplastic resin and the metal member 11 are accelerated during the joining, thereby further improving the joint strength between the members.

A functional group that the thermoplastic polymer preferably has may be a group including at least one selected from the group consisting of an oxygen atom, a nitrogen atom, a fluorine atom, and a sulfur atom. More preferably, the functional group may contain at least an oxygen atom and/or a nitrogen atom, and much more preferably, the functional group may contain at least an oxygen atom.

Non-limiting examples of such a functional group include a carboxyl group (—COOH), a hydroxyl group (—OH), an amide bond group (—CO—NH—), an ester bond group (—CO—O—), an ether group (—O—), a thioether group (—S—), a carboxylate group (—COOR (where R represents an alkyl group having 1-3 carbon atoms)), a fluorine atom (—F), a urethane bond group (—NH—CO—O—), and a carbonate group (—O—CO—O—). The functional group may be at least one selected from the group consisting of these groups. Preferably, the functional group may be at least one selected from the group consisting of a carboxyl group (—COOH), a hydroxyl group (—OH), an amide bond group (—CO—NH—), and an ester bond group (—CO—O—). More preferably, the functional group may be at least one selected from the group consisting of a carboxyl group (—COOH), a hydroxyl group (—OH), and an amide bond group (—CO—NH—). Much more preferably, the functional group may be at least one selected from the group consisting of a carboxyl group (—COOH) and a hydroxyl group (—OH). Most preferably, the functional group may be a carboxyl group (—COOH). The ester bond group does not include a carboxyl group, a carboxylate group, a urethane bond group, and a carbonate group.

The above-described functional group may constitute at least part of a main chain and/or side chain of the thermoplastic polymer.

The thermoplastic polymer generally has, in addition to the functional group described above, a hydrogen atom in its main chain and/or side chain. Thus, the hydrogen atom in the thermoplastic polymer interacts with an oxygen atom in the metal oxide on the surface of the metal member through a hydrogen bond. On the other hand, a thermosetting resin (to be described later) constituting the resin member generally has a hydrogen atom and an oxygen atom. Thus, these atoms also interact with the functional group of the thermoplastic polymer due to a hydrogen bond. As a result, the metal member 11 and the resin member 12 are joined together.

Non-limiting examples of the thermoplastic polymer having a functional group include acid-modified polyolefin, a thermoplastic epoxy polymer, polyamide, a vinyl acetate-containing polymer, polyester, polyalkyl methacrylate, polycarbonate, polyurethane, polyether, a liquid crystal polymer, and a fluorine-containing polymer. The thermoplastic polymer does not necessarily have a functional group, and may be, for example, polyolefin. As the thermoplastic polymer, these polymers may be used alone, or two or more of them may be used in combination. In view of further improvement in joint strength, preferable examples of the thermoplastic polymer include acid-modified polyolefin, a thermoplastic epoxy polymer, polyamide, a vinyl acetate-containing polymer, and a mixture of them. In the same point of view, more preferable examples of the thermoplastic polymer include acid-modified polyolefin, a thermoplastic epoxy polymer, polyamide, and a mixture of them. In the same point of view, much more preferable examples of the thermoplastic polymer include acid-modified polyolefin, a thermoplastic epoxy polymer, and a mixture of them. In the same point of view, the most preferable thermoplastic polymer is acid-modified polyolefin.

Acid-modified polyolefin is a thermoplastic polymer having a carboxyl group in the side chain. "Acid-modified polyolefin" means polyolefin modified with acid. Non-limiting examples of the acid-modified polyolefin include a copolymer of a carboxyl group-containing monomer and an olefin-based monomer. The carboxyl group-containing monomer may be unsaturated carboxylic acid having 3-8, preferably 3-6, carbon atoms (including a carbon atom in a carboxyl group). Non-limiting examples thereof include acrylic acid, methacrylic acid, maleic acid, maleic anhydride, fumaric acid, citraconic acid, and citraconic anhydride. The olefin-based monomer may be unsaturated hydrocarbon having 2-8, preferably 2-4, carbon atoms. Non-limiting examples thereof include ethylene, propylene, and butylene. The ratio of the carboxyl group-containing monomer with respect to the total monomer forming the acid-modified polyolefin is 10 mol % or higher, in particular, 10-90 mol %, preferably 30-70 mol %. In the present specification, unless otherwise specified, the number of carbon atoms, if they are contained in a compound, includes the number of carbon atoms in the carboxyl group.

The thermoplastic epoxy polymer is a thermoplastic polymer having a hydroxyl group in the side chain. The thermoplastic epoxy polymer is a product of polyaddition reaction between a diepoxy compound and a diol compound. The diepoxy compound is not particularly limited as long as it includes two epoxy groups in a single molecule. Preferable examples of the diepoxy compound include an aromatic diepoxy compound. Non-limiting examples of the aromatic diepoxy compound include bisphenol A diglycidyl ether, bisphenol F diglycidyl ether, brominated bisphenol A diglycidyl ether, hydrogenated bisphenol A diglycidyl ether, bisphenol S diglycidyl ether, bisphenol AF diglycidyl ether, and 4,4'-dihydroxybiphenyl diglycidyl ether. The diol compound is not particularly limited as long as it includes two hydroxyl groups in a single molecule. Preferable examples of the diol compound include an aliphatic diol compound. Non-limiting examples of the aliphatic diol compound include a saturated aliphatic diol compound having 2-6, preferably 2-4, carbon atoms. Examples thereof include ethylene glycol, 1,2-propanediol, 1,3-propanediol, 1,2-butanediol, 1,3-butanediol, 1,4-butanediol, and 2,3-butanediol. The diepoxy compounds and the diol compounds may be used alone, or two or more of them may be used in combination.

Polyamide is a thermoplastic polymer having an amino bond group in the main chain. Polyamide is a product of polycondensation of a dicarboxylic acid compound and a diamine compound, or a product of ring-opening polymerization of a cyclic amino compound. The cyclic amide compound may also be used as a reactive monomer of the former polycondensation. The dicarboxylic acid compound is not particularly limited as long as it includes two carboxyl groups in a single molecule. Preferable examples of the dicarboxylic acid compound include aliphatic dicarboxylic acid and aromatic dicarboxylic acid. The aliphatic dicarboxylic acid may be saturated aliphatic dicarboxylic acid having 3-12, preferably 4-10, carbon atoms. Non-limiting examples thereof include malonic acid, succinic acid, glutaric acid, adipic acid, pimelic acid, suberic acid, azelaic acid, and sebacic acid. The aromatic dicarboxylic acid may preferably have 8-12 carbon atoms. Non-limiting examples thereof include terephthalic acid, isophthalic acid, and 1,8-naphthalenedicarboxylic acid. The diamine compound is not particularly limited as long as it includes two amino groups in a single molecule. Preferable examples of the diamine compound include aliphatic diamine and aromatic diamine. The aliphatic diamine may be saturated aliphatic diamine having 2-12, preferably 4-10, carbon atoms. Non-limiting examples thereof include ethylenediamine, propylenediamine, trimethylenediamine, tetramethylenediamine, pentamethylenediamine, hexamethylenediamine, nonanediamine, and 2-methyl-1,5-pentandiamine. The aromatic diamine may have 6-12, preferably 6-8, carbon atoms. Non-limiting examples thereof include o-phenylenediamine, m-phenylenediamine, p-phenylenediamine, and metaxylylene diamine. The cyclic amide compound may have 4-14 carbon atoms. Non-limiting examples thereof include ε-caprolactam, undecane lactam, and lauryl lactam. The dicarboxylic acid compounds, the diamine compounds, and the cyclic amide compounds may be used alone, or two or more of them may be used in combination. Preferable examples of polyamide include PA6, PA66, PA11, PA12, PA6T, PA9T, and MXD6.

The vinyl acetate-containing polymer is a thermoplastic polymer having an ester bond group in the side chain. The vinyl acetate-containing polymer is a copolymer of vinyl acetate and an olefin-based monomer. The olefin-based monomer may be unsaturated hydrocarbon having 2-8, preferably 2-4, carbon atoms. Non-limiting examples thereof include ethylene, propylene, and butylene. The ratio of vinyl acetate with respect to the total monomer forming the vinyl acetate-containing polymer is 10 mol % or higher, in particular, 10-90 mol %, preferably 30-70 mol %.

Polyester is a thermoplastic polymer having an ester bond group in the main chain. Polyester is a product of polycondensation of a diol compound and a dicarboxylic acid compound, or a product of polycondensation of a monohydroxy monocarboxylic acid compound. The monohydroxy monocarboxylic acid compound may also be used as a reactive monomer of the former polycondensation. The diol compound is not particularly limited as long as it includes two hydroxyl groups in a single molecule. The diol compound may have 2-10 carbon atoms. Non-limiting examples thereof include ethylene glycol, 1,4-butanediol, 1,3-propanediol, and 1,4-cyclohexanedimethanol. The dicarboxylic acid compound is not particularly limited as long as it includes two carboxyl groups in a single molecule. The dicarboxylic acid compound may have 4-14 carbon atoms. Non-limiting examples thereof include terephthalic acid, and 2,6-naphthalenedicarboxylic acid. The monohydroxy monocarboxylic acid compound is not particularly limited as long as it includes one carboxyl group and one hydroxyl group in a single molecule. The monohydroxy monocarboxylic acid compound may have 2-8 carbon atoms. Non-limiting examples thereof include lactic acid.

Polyalkyl methacrylate is a thermoplastic polymer having a carboxylate group in the side chain. The alkyl group may have 1-3 carbon atoms. Non-limiting examples of polyalkyl methacrylate preferably include polymethyl methacrylate (PMMA) and polyethyl methacrylate.

Polycarbonate is a thermoplastic polymer having a carbonate group in the main chain. Polycarbonate is a polymer of bisphenol A and phosgene or diphenyl carbonate.

Polyurethane is a thermoplastic polymer having a urethane bond group in the main chain. Polyurethane is a polymer of a diol compound and a diisocyanate compound, for example.

Polyether is a thermoplastic polymer having an ether bond group in the main chain. Alternatively, polyether may have a thioether bond group in place of, or in addition to, the ether bond group. Polyether may further include a carbonyl group. Non-limiting examples of the polyether preferably include polyphenylene ether (PPE), polyacetal (POM), polyphenylene sulfide (PPS), and polyether ether ketone (PEEK).

The liquid crystal polymer is a thermoplastic polymer having an ester bond group in the main chain.

Non-limiting examples of polyolefin usable as the thermoplastic polymer include a homopolymer or copolymer of an olefin-based monomer such as ethylene, propylene, and butylene.

In view of further improvement in joint strength, the thermoplastic polymer preferably has the above-described functional group(s) in the side chain(s). More preferable examples of the thermoplastic polymer include polymers in which a monovalent functional group among the above-described functional groups is directly bonded as the side chain to a carbon atom in the main chain. Non-limiting examples of such thermoplastic polymers include acid-modified polyolefin and a thermoplastic epoxy polymer.

The molecular weight of the thermoplastic polymer is not particularly limited as long as the thermoplastic polymer can be molten during the joining. For example, the thermoplastic polymer may have a molecular weight which makes the melting point be 140-350° C., in particular, 140-300° C.

The thermoplastic resin may further contain, for example, a filler such as carbon fibers and glass fibers, and an additive such as a plasticizer.

The thermoplastic resin of any form described above interposed between the metal member 11 and the resin member 12 may preferably have a thickness of 10-600 μm, in particular, 100-550 μm. If the thermoplastic resin is too thick, the thermoplastic resin is hard to melt, and cannot contribute sufficiently to the joining. If the thermoplastic resin is too thin, the amount of the thermoplastic resin molten becomes too small to contribute sufficiently to the joining. The thermoplastic resin may have a combination of the above-described forms as long as the total thickness of the thermoplastic resin falls within the above-described range.

The arrangement and dimensions (except for the thickness) of the thermoplastic resin are not particularly limited as long as the metal member and the resin member are joined together. In general, the thermoplastic resin 50 may be present in a region of the metal member 11 and a region of the resin member 12 which will be joined together. In the friction stir welding, the arrangement and dimensions (except for the thickness) of the thermoplastic resin 50 are not particularly limited as long as the thermoplastic resin 50 generally covers at least a directly beneath region 112 of a surface 121 of the resin member 12 facing the metal member 11. Specifically, suppose that the rotary tool 16 has a diameter D1, the thermoplastic resin 50 is generally a round sheet having a diameter of D1 to D1×2, suitably D1×1.1 to D1×1.5, and arranged such that the center thereof is aligned with the axis of the rotary tool. The directly beneath region 112 is a region of the surface 121 of the resin member 12 facing the metal member 11, which is located directly beneath the rotary tool 16.

(3) Metal Member

The metal member 11 may be made of any metal having a higher melting point than the thermoplastic polymer forming the thermoplastic resin 50. Above all, the following metals and alloys generally used in the automotive field are preferably used:

aluminum and aluminum alloys (5000 series and 6000 series);
steel;
magnesium and alloys thereof; and
titanium and alloys thereof.

The metal member 11 used in the present invention has the shape of a substantially flat plate as a whole as shown in FIG. 1, but this is not limiting. The metal member 11 may have any shape as long as at least a portion thereof overlapping with the resin member 12 has the shape of a substantially flat plate. The portion of the metal member 11 overlapping with the resin member 12 generally has flat surfaces.

The portion of the metal member 11 which is substantially in the shape of a flat plate and overlapping with the resin member 12 generally has a thickness T (thickness before the joining; see FIG. 3) of 0.5-4 mm, but this is not limiting.

(4) Resin Member

The resin member 12 is a thermosetting resin member which is cured by heat, i.e., a cured product of a thermosetting resin. The "curing" means the formation of a three-dimensional network structure. The "thermosetting resin" is a resin which can be cured by heat.

Non-limiting examples of the thermosetting resin include a thermosetting epoxy resin, a thermosetting phenol resin, a thermosetting melamine resin, and a thermosetting urea resin. In view of further improvement in joint strength, the thermosetting epoxy resin is preferably used as the thermosetting resin.

The thermosetting epoxy resin contains an epoxy resin and a curing agent.

The epoxy resin is not particularly limited as long as it is a compound having two or more epoxy groups. Non-limiting examples of the epoxy resin include: a bifunctional glycidyl ether epoxy resin including an epoxy compound having a bisphenyl group (such as a bisphenol A epoxy compound, a bisphenyl F epoxy compound, a brominated bisphenyl A epoxy compound, a hydrogenated bisphenyl A epoxy compound, a bisphenyl S epoxy compound, a bisphenyl AF epoxy compound, and a biphenyl epoxy compound), a polyalkylene glycol epoxy compound, an alkylene glycol epoxy compound, an epoxy compound having a naphthalene ring, and an epoxy compound having a fluorene group; a multifunctional glycidyl ether epoxy resin including a phenolic novolac epoxy resin, an orthocresol novolac epoxy resin, a trishydroxyphenylmethane epoxy resin, and a tetraphenylolethane epoxy resin; a glycidyl ester epoxy resin of synthetic aliphatic acid such as dimer acid; an aromatic epoxy resin having a glycidylamino group such as N,N,N',N'-tetraglycidyl diaminodiphenylmethane (TGDDM), tetraglycidyl-m-xylylenediamine, triglycidyl-p-aminophenol, and N,N-diglycidylaniline; and an epoxy compound having a tricyclodecane ring (e.g., an epoxy compound obtained by polymerizing dicyclopentadiene and cresols (such as m-cresol) or phenols, and reacting the obtained polymer with epichlorohydrin). In addition, for example, an epoxy resin having a sulfur atom in the main chain, such as FLEP 10 manufactured by Toray Fine Chemicals Co., Ltd., may also be used. The epoxy resins may be used alone, or two or more of them may be used in combination. Among them, a bisphenol A epoxy resin and/or a bisphenol F epoxy resin are preferably used. The amount of the bisphenol A epoxy resin and/or bisphenol F epoxy resin is preferably larger than 0 parts by mass and not larger than 100 parts by mass, more preferably larger than 0 parts by mass and not larger than 70 parts by mass, of the total amount of the epoxy resin. In the present invention, the content of the bisphenol A epoxy resin and bisphenol F epoxy resin is the amount added.

The curing agent which can be contained in the thermosetting epoxy resin together with the epoxy resin may be polyamine, acid anhydride, or a mixture of them. Non-limiting examples of polyamine include: aromatic polyamine such as o-phenylenediamine, m-phenylenediamine, p-phenylenediamine, and m-xylylene diamine, diaminodiphenylmethane, diaminodiphenylsulfone, and diaminodiethyldiphenylmethane; aliphatic polyamine such as ethylenediamine, propylenediamine, butylenediamine, diethylenetriamine, triethylenetetramine, tetraethylenepentamine, pentaethylenehexamine, hexamethylenediamine, trimethylhexametylenediamine, 1,2-propanediamine, iminobispropylamine, methyliminobispropylamine, and MPMD manufactured by DuPont Japan; N-aminoethylpiperazine; monoamine having an ether bond in the main chain such as 3-butoxyisopropylamine; diamine having a polyether skeleton represented by JEFFAMINE EDR-148 manufactured by Sun Techno Chemicals Co., Ltd.; alicyclic polyamine such as isophorondiamine, 1,3-bisaminomethyl-cyclohexane, 1-cyclohexylamino-3-aminopropane, 3-aminomethyl-3,3,5-trimethylcyclohexylamine; diamine having a norbornane skeleton represented by NBDA manufactured by Mitsui Chemicals; polyamidoamine having an amino group at a terminal end of a polyamide molecule; and 2,5-dimethyl-2,5-hexamethylenediamine, menthenediamine, 1,4-bis(2-amino-2-methylpropyl)piperazine, JEFFAMINE D230 and JEFFAMINE D400 having a polypropylene glycol (PPG) skeleton manufactured by Sun Techno Chemicals Co., Ltd. Non-limiting examples of acid anhydride include trimellitic anhydride, pyromellitic anhydride, hexahydrophthalic anhydride, methylhexahydrophthalic anhydride, nadic anhydride, methyl nadic anhydride, tetrahydrophthalic anhydride, methyltetrahydrophthalic anhydride, and dodecenyl succinic anhydride (DSA).

The thermosetting phenol resin contains phenol and/or a derivative thereof, and formaldehyde.

The thermosetting melamine resin contains melamine and/or a derivative thereof, and formaldehyde.

The thermosetting urea resin contains urea and/or a derivative thereof, and formaldehyde.

The resin member 12 has the shape of a substantially flat plate as a whole as shown in FIG. 1, but this is not limiting. The resin member 12 may have any shape as long as a portion thereof located directly beneath the metal member 11 when the resin member 12 and the metal member 11 are stacked one above the other has the shape of a substantially flat plate. The portion of the resin member 12 directly beneath the metal member 11 generally has flat surfaces.

The portion of the resin member 12 directly beneath the metal member 11 generally has a thickness t (thickness before the joining; see FIG. 3) of 2-10 mm, in particular, 2-5 mm, but this is not limiting.

The resin member 12 may further contain, for example, additives such as reinforcing fibers, a filler, a stabilizer, a flame retardant, a coloring agent, and a foaming agent.

The resin member 12 can be formed by using an autoclave, hand lay-up, resin transfer molding (RTM), filament winding, or any other suitable molding method.

The resin member 12 can also be formed by injection- or press-molding a mixture of a thermosetting resin and a desired additive, and maintaining the obtained product at high temperature so that the product is sufficiently cured.

(5) Joining Method

The method for joining the metal member and the resin member by friction stir welding according to the present invention includes at least the following steps.

Specifically, the method includes: a first step of stacking the metal member 11 and the resin member 12 one above the other with the thermoplastic resin 50 interposed therebetween; and a second step of plunging the rotary tool 16, which is rotating, into the metal member 11 to generate frictional heat, by which the thermoplastic resin 50 is softened and molten, and then solidifying the molten thermoplastic resin 50 to join the metal member 11 and the resin member 12 together.

In the first step, as shown in FIG. 1, a desired joining portion of the metal member 11 and a desired joining portion pf the resin member 12 are stacked one above the other with the thermoplastic resin 50 (not shown in FIG. 1) interposed therebetween.

In the second step, at least a plunging/stirring process C2 is suitably performed, in which the rotary tool 16 is plunged into the metal member 11 to a depth close to but not reaching a boundary surface 13 between the metal member 11 and the thermoplastic resin 50.

In the second step, a preheating process C1 in which the rotary tool 16 is rotated with only the tip end of the rotary tool 16 brought into contact with the surface of the metal member 11 is suitably performed before the plunging/stirring process C2. However, the preheating process C1 is not always necessary.

After the plunging/stirring process C2, a continuous stirring process C3 is suitably performed, in which the rotary tool 16 plunged into the metal member 11 to a depth close to but not reaching the boundary surface is allowed to rotate continuously. However, the continuous stirring process C3 is not always necessary.

The processes according to the present invention may be performed through control of the pressure (welding pressure) applied by the rotary tool and pressing time, or control of a distance traveled by the rotary tool in the pressing direction (how much the rotary tool is plunged into the joining target after the rotary tool touched the joining target) and traveling time.

These processes will be described in detail below.

(Preheating Process C1)

In the preheating process C1, the rotary tool 16 and the receiving tool 17 are brought close to each other, and as shown in FIG. 3, the rotary tool 16 is rotated with only the tip end of the rotary tool 16 being in contact with the surface (upper surface in the illustrated example) of the metal member 11. During the preheating process C1, the rotary tool 16 is rotated under a first pressure (e.g., 900 N) at a predetermined rotation speed (e.g., 3000 rpm) for a first pressing time (e.g., 1.00 sec).

Specifically, during the preheating process C1, the pressing of the rotary tool 16 generates frictional heat on the surface (upper surface) of the metal member 11. The frictional heat is transmitted to the inside of the metal member 11, thereby preheating a pressure region P (region pressed by the rotary tool 16) of the metal member 11 and its vicinity. This facilitates the plunging of the rotary tool 16 into the metal member 11 in the next plunging/stirring process C2.

In the preheating process C1, the first pressure and the first pressing time are set in view of easy plunging of the rotary tool 16, easy softening and melting of the resin member 12, and productivity. The values of the pressure and time may vary depending on, for example, the rotation speed of the rotary tool 16, the thickness and material of the metal member 11, or any other parameter. For example, if the metal member 11 is made of an aluminum alloy and has a thickness of 1 mm or more and 2 mm or less, the first pressure applied in the preheating process C1 is suitably 700 N or more and less than 1200 N. The first pressing time is suitably 0.5 seconds or more and less than 2.0 seconds. The rotation speed of the rotary tool is suitably 2000 rpm or more and 4000 rpm or less.

(Plunging/Stirring Process C2)

Figure 4:
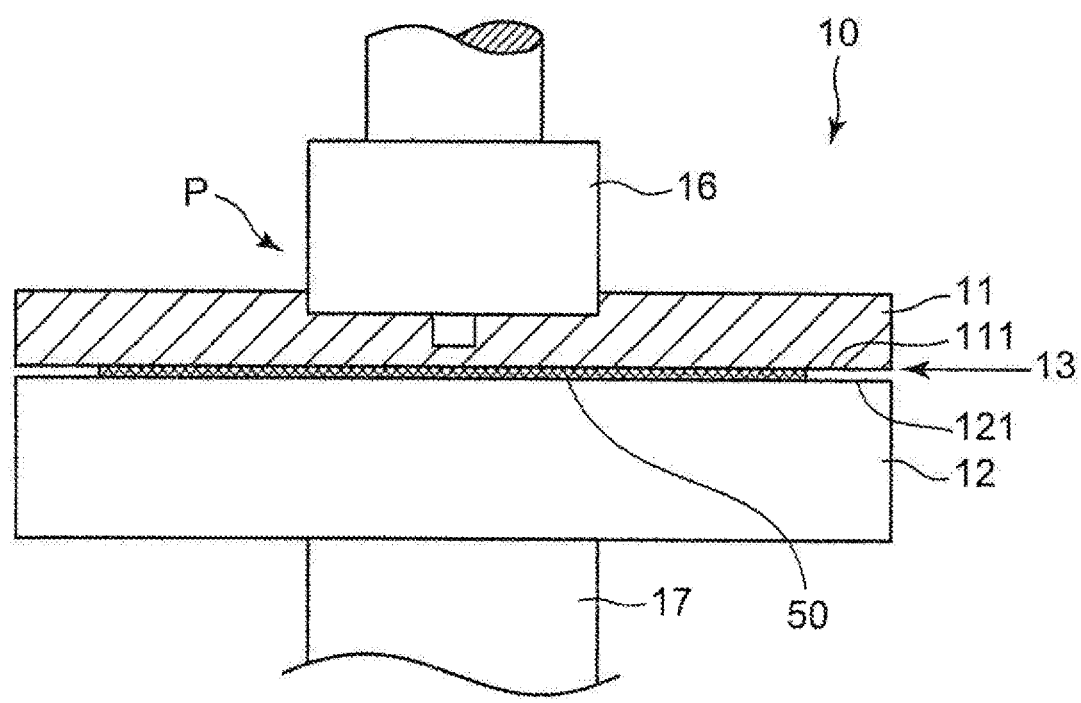
FIG. 4 is a schematic cross-sectional view illustrating an example of a plunging/stirring process, continuous stirring process, and retaining process of the present invention.

In the plunging/stirring process C2, the rotary tool 16 and the receiving tool 17 are brought close to each other so that the rotary tool 16 is plunged into the metal member 11 as shown in FIG. 4. If the plunging/stirring process C2 follows the preheating process C1, the rotary tool 16 and the receiving tool 17 are brought much closer to each other, thereby plunging the rotary tool 16 into the metal member 11 as shown in FIG. 4. Thus, the rotary tool 16 is plunged into the metal member 11 to a depth close to but not reaching a boundary surface 13 between the metal member 11 and the thermoplastic resin 50. At this time, a portion of the metal member 11 directly beneath the rotary tool may protrude toward the thermoplastic resin 50 (not shown).

Specifically, during the plunging/stirring process C2, the rotary tool 16 is rotated under a second pressure larger than the first pressure (e.g., 1500 N) at a predetermined rotation speed (e.g., 3000 rpm) for a second pressing time shorter than the first pressing time (e.g., 0.25 sec).

In the plunging/stirring process C2, the pressure is larger than that applied in the preheating process C1, which allows the rotary tool 16 to be plunged into the metal member 11. In other words, the rotary tool 16 sinks deeply into the metal member 11. In a suitable example, the plunging of the rotary tool 16 allows the boundary surface 13 between the metal member 11 and the thermoplastic resin 50 to be shifted toward the receiving tool 17 (downward in FIG. 4) at a portion of the metal member 11 directly beneath the rotary tool, i.e., the portion directly beneath the rotary tool protrudes toward the resin member 12 in the thermoplastic resin 50. As a result, the thermoplastic resin 50 is softened and molten by the frictional heat, and the molten resin flows from the directly beneath region 112 toward a region surrounding the directly beneath region 112 on the surface 121 of the resin member 12 facing the metal member 11. The molten resin flows in the substantially circular shape centering around the region directly beneath the rotary tool. As a result, after the molten resin is solidified through cooling, the metal member 11 and the thermoplastic resin 50 interact with each other in a wide region, and the thermoplastic resin 50 and the resin member 12 interact with each other in a wide region, thereby joining the metal member 11 and the resin member 12 together.

If the rotary tool 16 is further plunged into the metal member 11 (i.e., the pressure is too high and/or the pressing time is too long), the shoulder 16b of the rotary tool 16 goes beyond the boundary surface 13. That is, the rotary tool 16 penetrates the metal member 11, and an outer peripheral portion of the rotary tool 16 comes into contact with the thermoplastic resin 50 and the resin member 12. That is, the rotary tool 16 bores a hole in the metal member 11, which leads to failure in joining.

Therefore, in this plunging/stirring process C2, the plunging of the rotary tool 16 is stopped when the shoulder 16b of the rotary tool 16 has reached a depth close to but not reaching the boundary surface 13. In other words, the rotary tool 16 is plunged into the metal member 11 to a depth close to but not reaching the boundary surface 13. Thus, in the following continuous stirring process C3, the frictional heat is generated at a reference position near the resin member 12, and a large amount of frictional heat is transmitted to the resin member 12, thereby accelerating the softening and melting of the thermoplastic resin 50.

In the plunging/stirring process C2, the second pressure and the second pressing time are set so that the metal member 11 is not bored and the rotary tool 16 is brought as close as possible to the resin member 12. The values of the pressure and time may vary depending on, for example, the rotation speed of the rotary tool 16, the thickness and material of the metal member 11, or any other parameter. For example, if the metal member 11 is made of an aluminum alloy and has a thickness of 1 mm or more and 2 mm or less, the second pressure applied in the plunging/stirring process C2 is suitably 1200 N or more and less than 1800 N. The second pressing time is suitably 0.1 seconds or more and less than 0.5 seconds. The rotation speed of the rotary tool is suitably 2000 rpm or more and 4000 rpm or less.

(Continuous Stirring Process C3)

In the continuous stirring process C3, the rotary tool 16 and the receiving tool 17 are no longer brought close to each other, thereby allowing the rotary tool 16 to rotate continuously at a position where the rotary tool 16 has reached a depth close to but not reaching the boundary surface 13 (this position will be hereinafter referred to as a "reference position") as shown in FIG. 4. Specifically, during the continuous stirring process C3, the rotary tool 16 is rotated under a third pressure smaller than the first pressure (e.g., 500 N) at a predetermined rotation speed (e.g., 3000 rpm) for a third pressing time longer than the first pressing time (e.g., 5.75 sec).

In the continuous stirring process C3, the pressure is smaller than that applied in the preheating process C1 (and that applied in the plunging/stirring process C2). Thus, the rotary tool 16 is almost maintained at the reference position. Since the rotary tool 16 is allowed to rotate continuously at the reference position near the thermoplastic resin 50, a large amount of frictional heat is generated, most of which is transmitted to the thermoplastic resin 50. Thus, the thermoplastic resin 50 is sufficiently softened and molten in a wider region beyond the region directly beneath the pressure region P.

In the continuous stirring process C3, the third pressure and the third pressing time are set in view of sufficient softening and melting of the resin member 12 in a wider region as described above, and productivity. The values of the pressure and time may vary depending on, for example, the rotation speed of the rotary tool 16, the thickness and material of the metal member 11, or any other parameter. For example, if the metal member 11 is made of an aluminum alloy and has a thickness of 1 mm or more and 2 mm or less, the third pressure applied in the continuous stirring process C3 is suitably 100 N or more and less than 700 N. The third pressing time is suitably 1.0 second or more and less than 20 seconds, in particular, 3.0 seconds or more and 10 seconds or less. The rotation speed of the rotary tool is suitably 2000 rpm or more and 4000 rpm or less.

(Retaining Process C4)

After the continuous stirring process C3, a retaining process C4 may be performed, or may be skipped. In the retaining process C4, the rotary tool 16 is allowed to stop rotating, and retained under a predetermined pressure for a predetermined time.

In the retaining process C4, the rotary tool 16 is allowed to stop rotating, and the stopped rotary tool 16 is retained under a predetermined pressure for a predetermined time as shown in FIG. 4. Specifically, during the retaining process C4, the rotary tool 16 is allowed to rotate under a fourth pressure larger than the third pressure and smaller than the second pressure (e.g., 1000 N) for a fourth pressing time shorter than the third pressing time and longer than the second pressing time (e.g., 5.00 sec).

During the retaining process C4, the rotary tool 16 is allowed to stop rotating. Therefore, the frictional heat is no longer generated. That is, substantial operation related to the friction stir welding has ended, and cooling of the work 10 begins. During the cooling of the work 10, a pressure lower than that applied in the plunging/stirring process C2 and higher than that applied in the continuous stirring process C3 is applied. Thus, the metal member 11 and the resin member 12 are sandwiched and cramped between the rotary tool 16 which has stopped rotating and the receiving tool 17. This increases adhesion between the metal member 11 and the resin member 12 during the cooling, thereby improving the joint strength after the cooling and solidification.

In the retaining process C4, the fourth pressure and the fourth pressing time are set so as to increase the adhesion in a region directly beneath the pressure region P during the cooling described above. The values of the pressure and time may vary depending on, for example, the material of the metal member 11, or any other parameter. For example, if the metal member 11 is made of an aluminum alloy, the fourth pressure applied in the retaining process C4 is suitably 700 N or more and less than 1200 N. The fourth pressing time is suitably 1 second or more.

In the above-described joining method, suppose that the thermoplastic resin 50 has a melting point of Tm (° C.), the joining temperature is generally Tm−50° C. to Tm+150° C. In view of further improvement in the joining strength, the joining temperature suitably falls within the following range, depending on the kind of the thermoplastic resin 50.

If acid-modified polyolefin is used, the joining temperature is suitably Tm to Tm+150° C., more suitably Tm+20° C. to Tm+130° C., much more suitably Tm+70° C. to Tm+120° C.

If a thermoplastic epoxy polymer is used, the joining temperature is suitably Tm−50° C. to Tm+30° C., more suitably Tm−10° C. to Tm+20° C.

If polyamide is used, the joining temperature is suitably Tm+10° C. to Tm+70° C., more suitably Tm+20° C. to Tm+60° C.

If a vinyl acetate-containing polymer is used, the joining temperature is suitably Tm to Tm+80° C.

The joining temperature is the highest temperature of the directly beneath region 112 at an interface between the thermoplastic resin 50 and the resin member 12, and can be controlled by adjusting the pressure (welding pressure) applied by the rotary tool 16, the pressing time, the rotation speed of the rotary tool 16, the distance travelled by the rotary tool 16 in the pressing direction, the traveling time, and the rotation speed.

In the joining method described above, the rotary tool is not moved along the surface of the metal member in contact with the rotary tool, and the metal member and the resin member are joined at a fixed point (spot welding). Alternatively, if the rotary tool is moved along the surface of the metal member so that the metal member and the resin member are joined together along a line (line welding), it is obvious that the advantages of the present invention can also be provided.

EXAMPLE

Example 1

(Metal Member)

As a metal member, a flat plate member made of a 6000 series aluminum alloy (100 mm long×30 mm wide×1.2 mm thick) was used.

(Thermosetting Resin Member)

A bisphenol A epoxy resin (EP-834 manufactured by Japan Epoxy Resins Co., Ltd.) and o-phenylenediamine as a curing agent were mixed to prepare a thermosetting epoxy resin composition. The thermosetting epoxy resin composition was molded in a die, and maintained in the die at 230° C. to be cured sufficiently. Thus, a resin member 12 (100 mm long×50 mm wide×3 mm thick) was manufactured.

(Thermoplastic Resin Sheet)

A maleic acid-modified polypropylene polymer sheet (MODIC manufactured by Mitsubishi Chemical Cooperation, 500 μm thick) was used. Maleic acid-modified polypropylene was a copolymer of propylene and maleic anhydride (melting point: 143° C.).

The thermoplastic resin sheet was a round sheet having a diameter of 12 mm, and arranged such that the center thereof was aligned with the axis of the rotary tool.

(Rotary Tool)

The rotary tool 16 shown in FIG. 2 was used. The rotary tool had a diameter D1 of 10 mm, a diameter D2 of 2 mm, and a height of 0.5 mm, and was made of tool steel.

(Joining Method)

The metal member 11 and the resin member 12 were joined together by the following method.

First Step:

The metal member 11 and the resin member 12 were stacked one above the other with the thermoplastic resin sheet 50 interposed therebetween as shown in FIG. 1.

Second Step:

As shown in FIG. 3, the rotary tool 16 was allowed to rotate with only the tip end of the rotary tool 16 being in contact with the surface of the metal member 11 (preheating process C1, welding pressure: 900 N, pressing time: 1.00 second, tool's rotation speed: 3000 rpm).

Then, as shown in FIG. 4, the rotary tool 16 was plunged into the metal member 11 to a depth close to but not reaching a boundary surface between the metal member 11 and the thermoplastic resin 50 (plunging/stirring process C2, welding pressure: 1500 N, pressing time: 0.25 seconds, tool's rotation speed: 3000 rpm).

Then, as shown in FIG. 4, the rotary tool 16 that had been plunged into the metal member 11 to the depth close to but not reaching the boundary surface was allowed to rotate continuously (continuous stirring process C3, welding pressure: 500 N, pressing time: 5.75 seconds, tool's rotation speed: 3000 rpm).

Then, the rotary tool 16 was retracted from a joined product 20, and the joined product 20 was left stand for cooling.

In the method described above, the temperature of a region directly beneath the rotary tool at the interface between the thermoplastic resin sheet 50 and the resin member 12 was tracked. The highest temperature as the joining temperature was 223° C.

Using the above-described method, some joined products were obtained in the same manner except that the joining temperature was changed.

Example 2

Some joined products were obtained in the same manner as Example 1 except that a thermoplastic resin sheet described below was used and the joining temperature was changed.

(Thermoplastic Resin Sheet)

A thermoplastic epoxy polymer sheet (manufactured by Nagase ChemteX Cooperation, 500 μm thick) was used as the thermoplastic resin sheet. The thermoplastic epoxy polymer had a melting point of 260° C.

The thermoplastic resin sheet was a round sheet having a diameter of 12 mm, and arranged such that the center thereof was aligned with the axis of the rotary tool.

Example 3

Some joined products were obtained in the same manner as Example 1 except that a thermoplastic resin sheet described below was used and the joining temperature was changed.

(Thermoplastic Resin Sheet)

A polyamide polymer sheet (manufactured by Toray Plastics Precision Co., Ltd., 500 μm thick) was used as the thermoplastic resin sheet. Polyamide had a melting point of 220° C.

The thermoplastic resin sheet was a round sheet having a diameter of 12 mm, and arranged such that the center thereof was aligned with the axis of the rotary tool.

Example 4

Some joined products were obtained in the same manner as Example 1 except that a coating was formed, in place of using the thermoplastic resin sheet, by applying a thermoplastic resin solution on the metal member and drying the solution to a dry thickness of 500 μm, and that a copolymer of vinyl acetate and propylene was used as the thermoplastic resin (melting point: 165° C.).

[Joint Strength]

Figure 5:
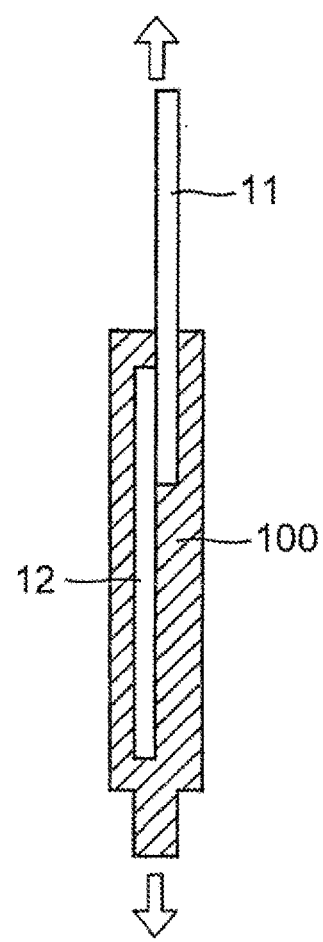
FIG. 5 is a schematic view illustrating a method for measuring a joint strength in Examples.
Figure 6:
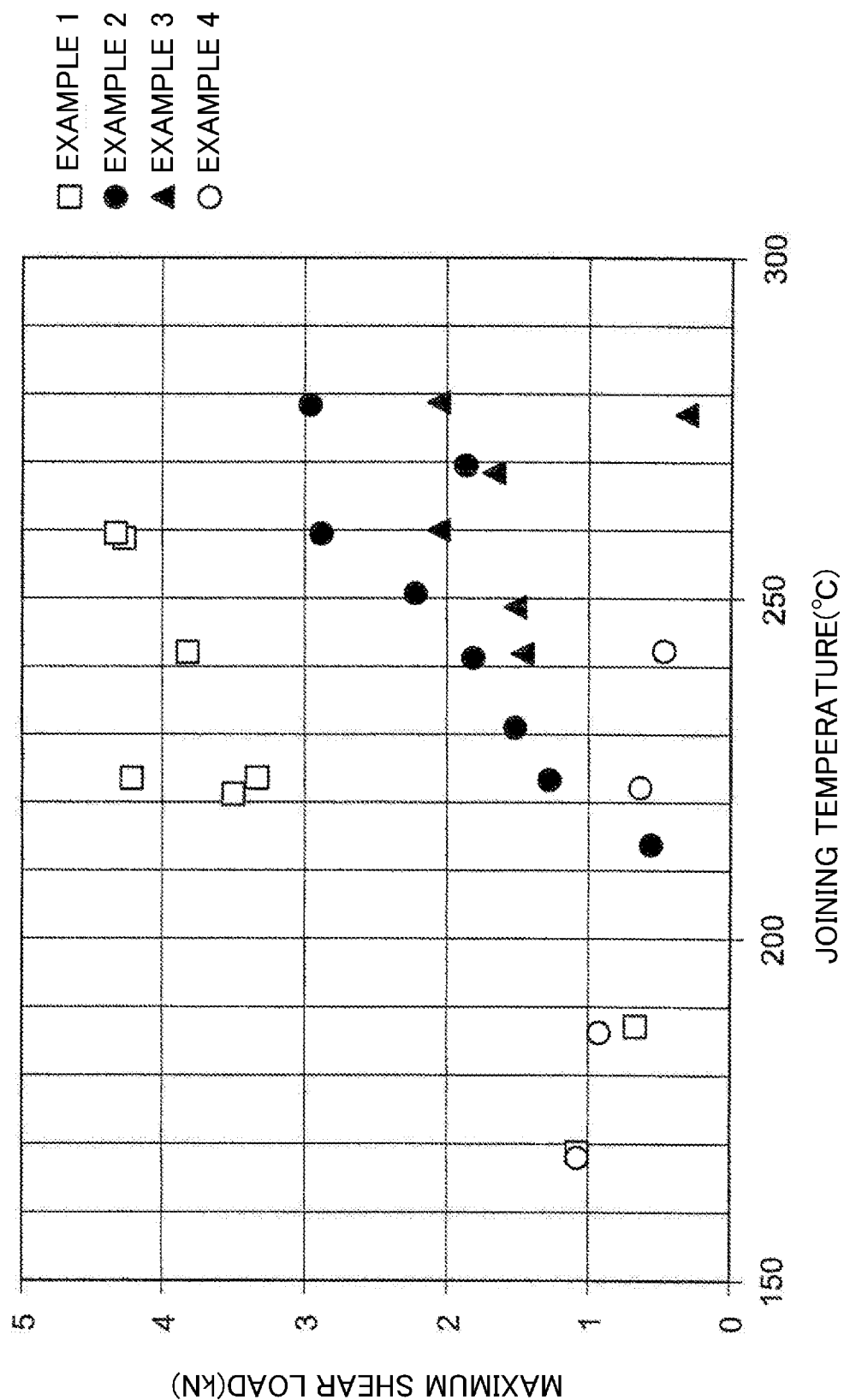
FIG. 6 is a graph illustrating a relationship between joining temperature and joint strength measured in Examples.
Figure 7:
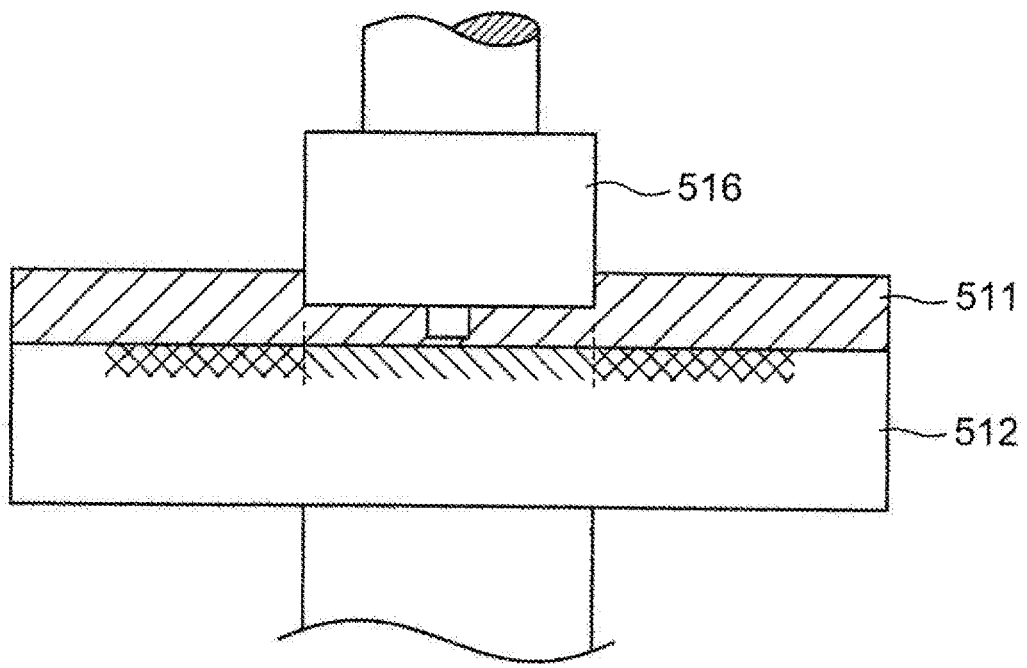
FIG. 7 is a schematic cross-sectional view illustrating a method for joining a metal member and a resin member together according to prior art.

As shown in FIG. 5, a joined product of the metal member 11 and the resin member 12 was placed in a jig 100. The jig 100 is configured to apply a downward load to an upper end of the resin member 12 when pulled downward. The jig 100 was fixed and the metal member 11 was pulled upward to apply a downward load to the upper end of the resin member 12, thereby measuring the joint strength (maximum shear load) of the joined part without receiving any influence of the strength of the base material of the resin member 12. FIG. 6 shows a relationship between the joining temperature and the joint strength.

INDUSTRIAL APPLICABILITY

The joining method of the present invention is useful for joining a metal member and a resin member together in various fields of, for example, automobiles, railcars, airplanes, and home appliances.

DESCRIPTION OF REFERENCE CHARACTERS

1: Friction Stir Welding Apparatus
10: Work
11: Metal Member
12: Resin Member
13: Boundary Surface between Metal Member and Thermoplastic Resin
16: Rotary Tool
17: Receiving Tool
50: Thermoplastic Resin (Layer)
100: Jig for Measuring Joint Strength
111: Metal Member's Surface facing Resin Member
P: Pressure Region (To-Be-Pressed Region)
121: Resin Member's Surface facing Metal Member

The invention claimed is:

1. A method for joining a metal member and a thermosetting resin member together, with a thermoplastic resin interposed between the metal member and the thermosetting resin member, wherein
the thermosetting resin member is a resin member that is not molten by heat, and
the method is implemented by friction stir welding, in which the metal member and the resin member are stacked one above the other with the thermoplastic resin interposed therebetween, a rotary tool, which is rotating, is pressed against the metal member to generate frictional heat, by which the thermoplastic resin is softened and molten, and then the molten thermoplastic resin is solidified to join the metal member and the thermosetting resin member.

2. The method of claim 1, wherein
the thermoplastic resin interposed between the metal member and the thermosetting resin member has a thickness of 10-600 μm.

3. The method of claim 1, wherein
the thermoplastic resin is in the form of at least one selected from the group consisting of a sheet, a coating formed on a surface of the metal member, and a coating formed on a surface of the thermosetting resin member.

4. The method of claim 1, wherein
the thermoplastic resin is a thermoplastic polymer having a functional group, and
the functional group contains at least one selected from the group consisting of an oxygen atom, a nitrogen atom, a fluorine atom, and a sulfur atom.

5. The method of claim 4, wherein
the functional group is at least one selected from the group consisting of a carboxyl group, a hydroxyl group, an amide bond group, an ester bond group, an ether group, a thioether group, a carboxylate group, a fluorine atom, a urethane bond group, and a carbonate group.

6. The method of claim 1, wherein
the thermoplastic polymer is at least one selected from the group consisting of acid-modified polyolefin, a thermoplastic epoxy polymer, polyamide, a vinyl acetate-containing polymer, polyester, polyalkyl methacrylate, polycarbonate, polyurethane, polyether, a liquid crystal polymer, a fluorine-containing polymer, and polyolefin.

7. The method of claim 1, wherein
the thermosetting resin member is made of at least one selected from the group consisting of a thermosetting epoxy resin, a thermosetting phenol resin, a thermosetting melamine resin, and a thermosetting urea resin.

8. The method of claim 1, wherein
the friction stir welding includes:
a first step of stacking the metal member and the thermosetting resin member one above the other with the thermoplastic resin interposed therebetween; and
a second step of pressing the rotation tool, which is rotating, against the metal member to generate frictional heat, by which the thermoplastic resin is softened and molten, and solidifying the molten thermoplastic resin to join the metal member and the resin member together.

9. The method of claim 8, wherein
the second step includes a plunging/stirring process of plunging the rotary tool into the metal member to a depth close to but not reaching a boundary surface between the metal member and the thermoplastic resin.

10. The method of claim 9, wherein
the second step includes a preheating process of allowing the rotary tool to rotate with only a tip end of the rotary tool being in contact with the surface of the metal member, the preheating process being performed before the plunging/stirring process.

11. The method of claim 10, wherein
during the preheating process, the rotary tool is allowed to rotate under a first pressure only for a first pressing time, and
during the plunging/stirring process, the rotary tool is allowed to rotate under a second pressure larger than the first pressure only for a second pressing time shorter than the first pressing time.

12. The method of claim 11, wherein
the second step further includes a continuous stirring process of allowing the rotary tool to rotate continuously at the depth close to but not reaching the boundary surface, and
during the continuous stirring process, the rotary tool is allowed to rotate under a third pressure smaller than the first pressure only for a third pressing time longer than the first pressing time.

13. A method for joining a metal member and a thermosetting resin member together, with a thermoplastic resin interposed between the metal member and the thermosetting resin member, wherein
the thermosetting resin member is a resin member made of a thermosetting resin and cured by heat, and
the method is implemented by friction stir welding, in which the metal member and the resin member are stacked one above the other with the thermoplastic resin interposed therebetween, a rotary tool, which is rotating, is pressed against the metal member to generate frictional heat, by which the thermoplastic resin is softened and molten, and then the molten thermoplastic resin is solidified to join the metal member and the thermosetting resin member.

14. The method of claim 9, wherein
a tip end of the rotary tool includes a shoulder being a tip end portion, and a pin protruding outward from the shoulder and having a smaller diameter than the shoulder, and
in the plunging/stirring process, the rotary tool is plunged into the metal member so that the shoulder of the rotary tool reaches a depth close to but not reaching a boundary surface between the metal member and the thermoplastic resin.

15. The method of claim 9, wherein
in the plunging/stirring process, due to plunging of the rotary tool a portion of the metal member directly beneath the rotary tool protrudes toward the resin member in the thermoplastic resin.

16. The method of claim 15, wherein
in the plunging/stirring process, the thermoplastic resin is softened and molten by the frictional heat and a portion directly beneath the rotary tool protruding toward the resin member, and the softened and molten thermoplastic resin flows a region directly beneath the rotary tool toward a region surrounding the region directly beneath the rotary tool on the surface of the resin member facing the metal member.

17. The method of claim 1, wherein
the thermoplastic resin has a thickness of 100-550 μm,
the thermoplastic resin has a melting point of 140-350° C., and
when the melting point of the thermoplastic resin is Tm, and a highest temperature of a region directly beneath the rotary tool at an interface between the thermoplastic resin and the thermosetting resin member is a joining temperature, the joining temperature is Tm−50° C. to Tm+150° C.

* * * * *